United States Patent Office.

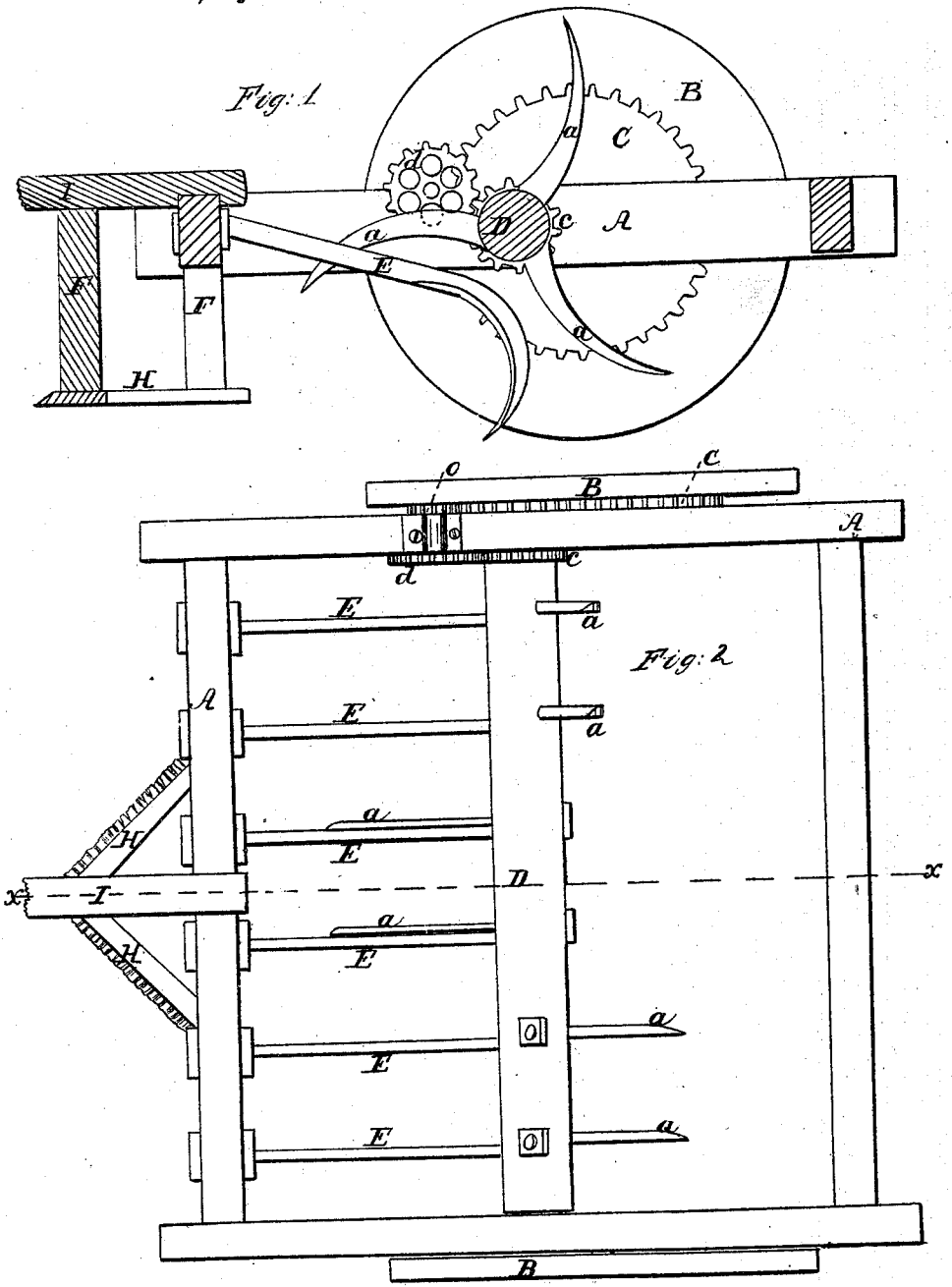

ALMON HUNT, OF MACOMB, ILLINOIS.

Letters Patent No. 68,749, dated September 10, 1867.

CORN-STALK CUTTER.

*The Schedule referred to in these Letters Patent and making part of the same.*

TO ALL WHOM IT MAY CONCERN:

Be it known that I, ALMON HUNT, of Macomb, in the county of McDonough, and State of Illinois, have invented certain new and useful improvements in Corn-Stalk Cutters for field use; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a machine, which, when drawn along over the field, will break or cut down the old corn-stalks, and then cut the stalks up into short lengths for the purpose of getting them out of the way, and rendering them more easily covered up in ploughing.

Figure 1 is a longitudinal vertical section, taken on the line $x\ x$ of fig. 2.

Figure 2 is a top plan view.

I construct a strong rectangular frame, A, of suitable size, and mount it on two wheels, B, like a cart, each wheel being journalled on an independent short axle on opposite sides of the frame. To the front end of the frame are secured strong vertical posts F, which project below the main frame, as shown in fig. 1, to the lower end of which I attach a V-shaped metal plate or knife, H, as represented in the drawings. To the front cross-bar of the frame A, I secure a series of metal hooks or curved bars, E, as shown in fig. 1, these hooks having their front curved edges made sharp, and their points reaching to the ground. Across the frame A, just in front of the axles, is placed a strong shaft, D, which is armed with a series of curved knives $a$, arranged to project radially, as shown in fig. 1. The front or concave edges of these knives $a$ are also sharpened by being bevelled on one side, the same as hooks E, and are arranged to strike close alongside of the hooks E, their flat surfaces or sides being placed next each other, so that each hook E with its corresponding blade $a$ operates together like a pair of shear blades in cutting.

Motion is communicated to the shaft D by means of a gear-wheel, C, secured to one of the supporting-wheels B, which engages with a pinion, O, on the outer end of a journal extending through the side bar of the frame A, and having a pinion, $d$, secured rigidly to its end inside of the frame; this latter pinion $d$ in turn engaging with a similar pinion, $c$, on the shaft D, as shown in fig. 2, whereby the knives or blades $a$ are made to revolve in the same direction as the wheels B, but at much greater speed. It will be observed that the blades $a$ are arranged in pairs on a spiral line around the shaft D, by which means they are caused to operate successively in pairs, instead of all at once. The plate H may, if desired, be made adjustable in height, so as to enter the ground sufficiently to uproot or cut under the standing stalks, or it may be so adjusted as to pass along above the surface, and either cut, break, or, by lateral pressure, bend over the stalks.

The operation is as follows: A team being hitched to the machine it is drawn over the field in such a manner as to straddle the row of stalks. The plate H coming in contact with the stalks cuts or breaks them down. The hooks E then catching them arrange them transversely, and hold them until the rapidly-revolving blades $a$, sweeping along by the side of the hooks E, cut the stalks up into short pieces, thereby preventing their clogging the plough, and insuring their being covered by the furrow-slice turned by the plough in the subsequent operation of ploughing the land. By this means I not only get them out of the way, but insure their being converted into manure, instead of lying loose on the surface in the way of the growing crop, and interfering with its cultivation, as is the case ordinarily.

Having thus described my invention, what I claim is—

1. The frame A, provided with the plate H, arranged substantially as described, for the purpose of cutting, breaking, or bending down the stalks, as set forth.

2. I claim the combination of the stationary curved hooks or blades E with the movable blades $a$, the latter being operated by the motion of the machine, said parts being constructed and arranged for joint operation substantially as described.

ALMON HUNT.

Witnesses:
   GEO. O. ISMINYER,
   WILLIAM WILSON.